US010771675B2

(12) United States Patent
Hosokawa

(10) Patent No.: US 10,771,675 B2
(45) Date of Patent: Sep. 8, 2020

(54) IMAGING CONTROL APPARATUS AND IMAGING CONTROL METHOD

(71) Applicant: Sony Corporation, Tokyo (JP)

(72) Inventor: Takayuki Hosokawa, Tokyo (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 16/303,547

(22) PCT Filed: Aug. 24, 2017

(86) PCT No.: PCT/JP2017/030342
§ 371 (c)(1),
(2) Date: Nov. 20, 2018

(87) PCT Pub. No.: WO2018/047630
PCT Pub. Date: Mar. 15, 2018

(65) Prior Publication Data
US 2019/0387174 A1 Dec. 19, 2019

(30) Foreign Application Priority Data
Sep. 7, 2016 (JP) .................. 2016-174513

(51) Int. Cl.
H04N 5/232 (2006.01)
G02B 7/38 (2006.01)

(52) U.S. Cl.
CPC ......... H04N 5/232122 (2018.08); G02B 7/38 (2013.01); H04N 5/23216 (2013.01); H04N 5/232127 (2018.08)

(58) Field of Classification Search
CPC ......... H04N 5/232122; H04N 5/23216; H04N 5/232127; H04N 5/3696; H04N 5/23293; H04N 5/23212; H04N 5/232; G02B 7/38; G02B 7/34; G03B 13/00; G03B 13/36; G03B 13/32; G03B 13/10
See application file for complete search history.

(56) References Cited

U.S. PATENT DOCUMENTS

| 2007/0206940 A1* | 9/2007 | Kusaka ................. G03B 13/28 396/128 |
| 2015/0365584 A1* | 12/2015 | Samurov ............... G03B 13/36 348/349 |
| 2016/0227103 A1* | 8/2016 | Ueguri ............... H04N 5/23293 |
| 2017/0359501 A1* | 12/2017 | Abe ................. H04N 5/232122 |
| 2019/0068869 A1* | 2/2019 | Kadambala .......... H04N 5/3696 |

FOREIGN PATENT DOCUMENTS

| JP | 2006-146031 A | 6/2006 |
| JP | 2007-233032 A | 9/2007 |
| JP | 2007233034 A | 9/2007 |

* cited by examiner

Primary Examiner — Timothy J Henn
(74) Attorney, Agent, or Firm — Michael Best & Friedrich LLP

(57) ABSTRACT

The present disclosure includes an imaging control apparatus, an imaging control method, and an imaging apparatus. The imaging control apparatus includes a focal point detection control circuitry configured to receive first information from a range-finding area of a dedicated phase difference detection sensor and second information from a range-finding area of an image plane phase difference detection sensor, and detect a focal point based on at least one of the first information or the second information.

20 Claims, 14 Drawing Sheets

FIG. 3

| R | G | R | G | R | G | R | G | R | G | R | G | R |
|---|---|---|---|---|---|---|---|---|---|---|---|---|
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |

12A

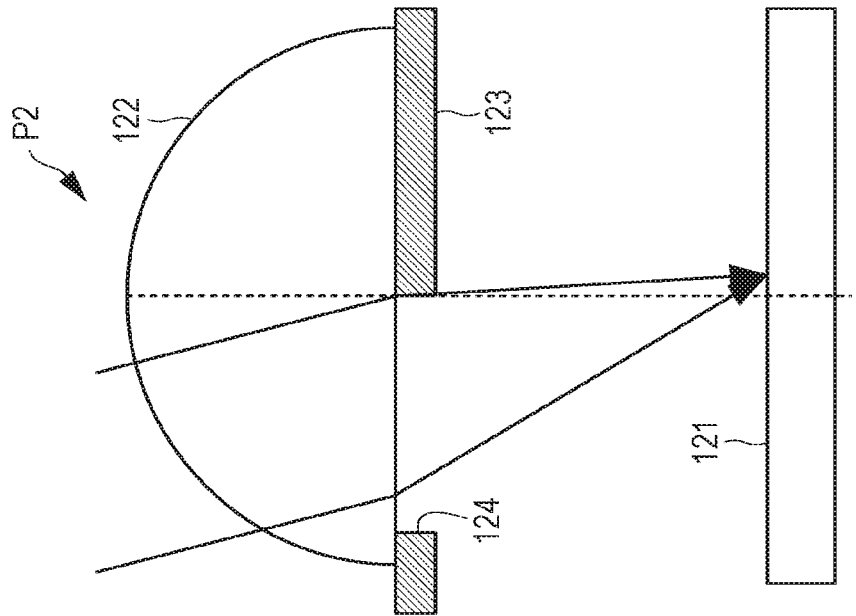
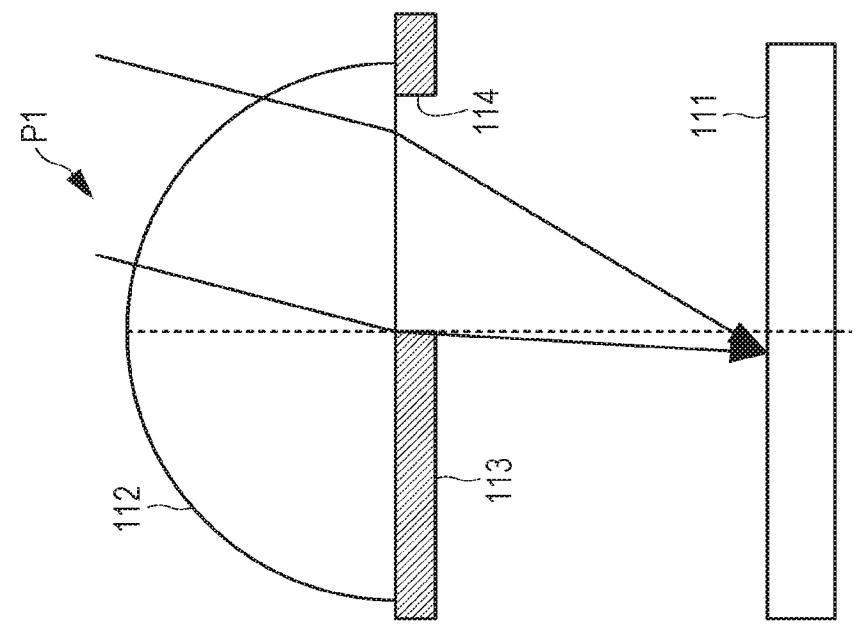
FIG. 4A
FIG. 4B

IMAGING CONTROL APPARATUS AND IMAGING CONTROL METHOD

This application claims the benefit of Japanese Priority Patent Application JP 2016-174513 filed on Sep. 7, 2016, the entire contents of which are incorporated herein by reference.

TECHNICAL FIELD

The present disclosure relates to an imaging control apparatus and an imaging control method.

BACKGROUND ART

A variety of techniques for automatically detecting a focal point (auto-focus techniques) have been suggested in the past. For example, Patent Literature 1 mentioned below has disclosed an imaging apparatus configured to adjust a focal point using a focal point detector constituted by a dedicated sensor and a focal point detector using part of pixels constituting an image sensor by selectively switching therebetween.

CITATION LIST

Patent Literature

[PTL 1]
 JP 2007-233034A

SUMMARY

Technical Problem

Enhancement of the accuracy of auto focus has been desired in such a field.

There is a need for providing an imaging control apparatus and an imaging control method capable of enhancing the accuracy of auto focus.

Solution to Problem

According to an embodiment of the present disclosure, there is provided, for example, an imaging control apparatus including a focal point detection control circuitry configured to receive first information from a range-finding area of a dedicated phase difference detection sensor and second information from a range-finding area of an image plane phase difference detection sensor, and detect a focal point based on at least one of the first information or the second information.

In addition, according to another embodiment of the present disclosure, there is provided, for example, an imaging control method. The method includes receiving, with a focal point detection control circuitry, first information from a range-finding area of a dedicated phase difference detection sensor and second information from a range-finding area of an image plane phase difference detection sensor. The method also includes detecting, with the focal point detection control circuitry, a focal point on a basis of the first information and the second information.

In addition, according to yet another embodiment of the present disclosure, there is provided, for example, an imaging apparatus. The imaging apparatus includes a dedicated phase difference detection sensor, an image plane phase difference detection sensor, and a focal point detection control circuitry. The focal point detection control circuitry is configured to receive first information from a range-finding area of the dedicated phase difference detection sensor and second information from second a range-finding area of the image plane phase difference detection sensor, and detect a focal point based on at least one of the first information or the second information.

Advantageous Effects of Invention

At least one embodiment of the present disclosure can enhance the accuracy of auto focus. Note that, the effects described herein are not necessarily limited and any effects described in the present disclosure may be applied. In addition, exemplified effects are not interpreted to limit the content of the present disclosure.

BRIEF DESCRIPTION OF DRAWINGS

FIG. 3 is a diagram for explaining an exemplary arrangement of phase difference detecting pixels.

FIGS. 4A and 4B are diagrams for explaining exemplary configurations of a pair of the phase difference detecting pixels.

DESCRIPTION OF EMBODIMENTS

Hereinafter, embodiments and so on according to the present disclosure will be described with reference to the drawings. Note that the description will be given in the following order.
<1. Embodiments>
<2. Variations>

The embodiments and so on described below are favorable specific examples according to the present disclosure and the content of the present disclosure is not limited to these embodiments and so on.

1. Embodiments

[Exemplary Configuration of Imaging Apparatus]

Figure 1:
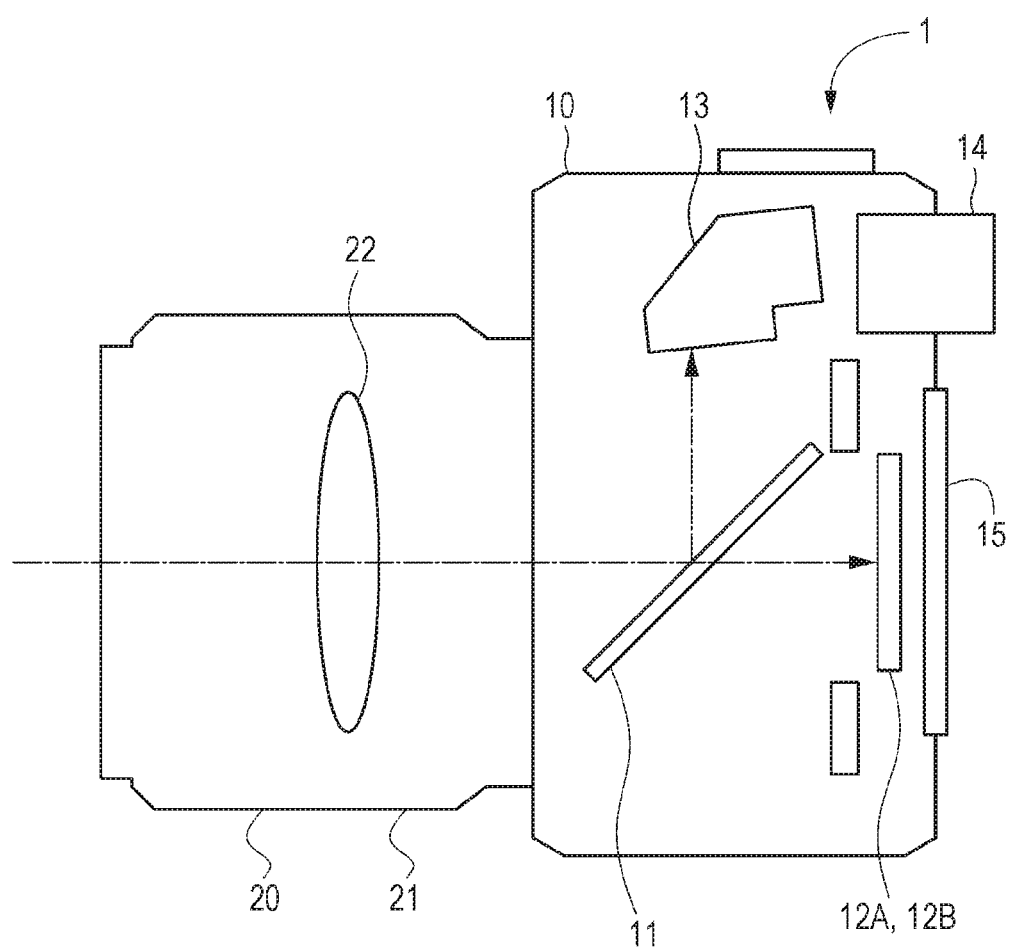
FIG. 1 is a schematic cross-sectional view illustrating an overview configuration of an imaging apparatus according to an embodiment of the present disclosure.

First, an exemplary configuration of an imaging apparatus according to an embodiment of the present disclosure will be described. FIG. 1 is a schematic cross-sectional view illustrating an overview configuration of the imaging apparatus 1 according to the embodiment of the present disclosure.

The imaging apparatus 1 includes a cabinet (body) 10, an optical imaging system 20 including an imaging lens 22, a semi-transmissive mirror 11, an image sensor 12A, an image plane auto focus (AF) sensor 12B (e.g., an image plane phase difference detection sensor), a dedicated phase difference AF sensor 13 (e.g., a dedicated phase difference detection sensor), an electronic viewfinder 14, and a display 15. For example, a configuration including the image sensor 12A and the optical imaging system 20 constitutes an imaging unit.

As illustrated in FIG. 1, the optical imaging system 20 is provided so as to oppose the cabinet 10. The optical imaging system 20 is, for example, a so-called replaceable lens unit, in which the imaging lens 22, a diaphragm, and so on are provided within a lens barrel 21. The imaging lens 22 is driven by a focus drive system (not illustrated) such that an AF action is enabled. Note that the optical imaging system 20 may be configured as an integrated body with the cabinet 10, or alternatively, may be configured in such a manner that the optical imaging system 20 can be attached to and detached from the cabinet 10 via a predetermined adapter.

The semi-transmissive mirror 11 is provided within the cabinet 10 so as to be located between the imaging lens 22 and the image sensor 12A within the cabinet 10. Light from object enters the semi-transmissive mirror 11 via the imaging lens 22. Part of the light from object entering via the imaging lens 22 is reflected on the semi-transmissive mirror 11 to a direction of the dedicated phase difference AF sensor 13 located upward and at the same time, part of the light passes through the semi-transmissive mirror 11 toward the image sensor 12A. Note that the transmittance, the reflectance, and so on of the semi-transmissive mirror 11 can be freely set. In addition, the semi-transmissive mirror 11 may be of a fixed type or a movable type.

The image sensor 12A for generating a captured image is provided within the cabinet 10. A charge coupled device (CCD), a complementary metal oxide semiconductor (CMOS), or the like is used as the image sensor 12A. The image sensor 12A converts the light from object entering via the imaging lens 22 to an amount of electric charge through photoelectric conversion and then generates an image. Predetermined signal processing including white balance adjustment processing and gamma correction processing is applied to an image signal and ultimately, the image signal is saved, as image data, to a storage medium within the imaging apparatus 1, an external memory, a portable memory that can be attached to and detached from the imaging apparatus 1, or the like.

The image sensor 12A has usual imaging pixels, for example, a red (R) pixel, a green (G) pixel, and a blue (B) pixel and also has the image plane AF sensor 12B that carries out phase difference focal point detection. Each of the pixels constituting the image sensor converts incident light (e.g., light from a common light source) from the object to an amount of electric charge through photoelectric conversion and then outputs a pixel signal.

The dedicated phase difference AF sensor 13 is provided within the cabinet 10 so as to be positioned, for example, above the semi-transmissive mirror 11 and also in front of the image sensor 12A. The dedicated phase difference AF sensor 13 is, for example, a module dedicated for auto focus according to a phase difference detection technique. The light from object collected by the imaging lens 22 is reflected on the semi-transmissive mirror 11, thereby entering the dedicated phase difference AF sensor 13. A focal point detection signal detected by the dedicated phase difference AF sensor 13 is supplied to, for example, a processing unit configured to calculate an amount of defocus within the imaging apparatus 1.

The electronic viewfinder (EVF) 14 is provided in the cabinet 10. The electronic viewfinder 14 includes, for example, a liquid crystal display (LCD) or an organic electroluminescence (EL) display. While the image data is supplied to the electronic viewfinder 14 upon being obtained by a signal processing unit (not illustrated) through processing on the image signal taken out from the image sensor 12A, the electronic viewfinder 14 displays this data as a real-time image (through image).

The display 15 is provided in the cabinet 10. The display 15 is, for example, a flat display such as a liquid crystal display or an organic EL display. While the image data is supplied to the display 15 upon being obtained by a signal processing unit (not illustrated) through processing on the image signal taken out from the image sensor 12A, the display 15 displays this data as a real-time image (so-called through image). The display 15 is provided on a rear surface side of the cabinet in FIG. 1 but not limited thereto. The display 15 may be provided, for example, on a top surface of the cabinet, or alternatively, may be of a movable type or a removable type. The display 15 may not be included in the cabinet 10. In this case, a television apparatus or the like connected to the imaging apparatus 1 may function as the display 15.

[Exemplary Internal Configuration of Imaging Apparatus]

Figure 2:
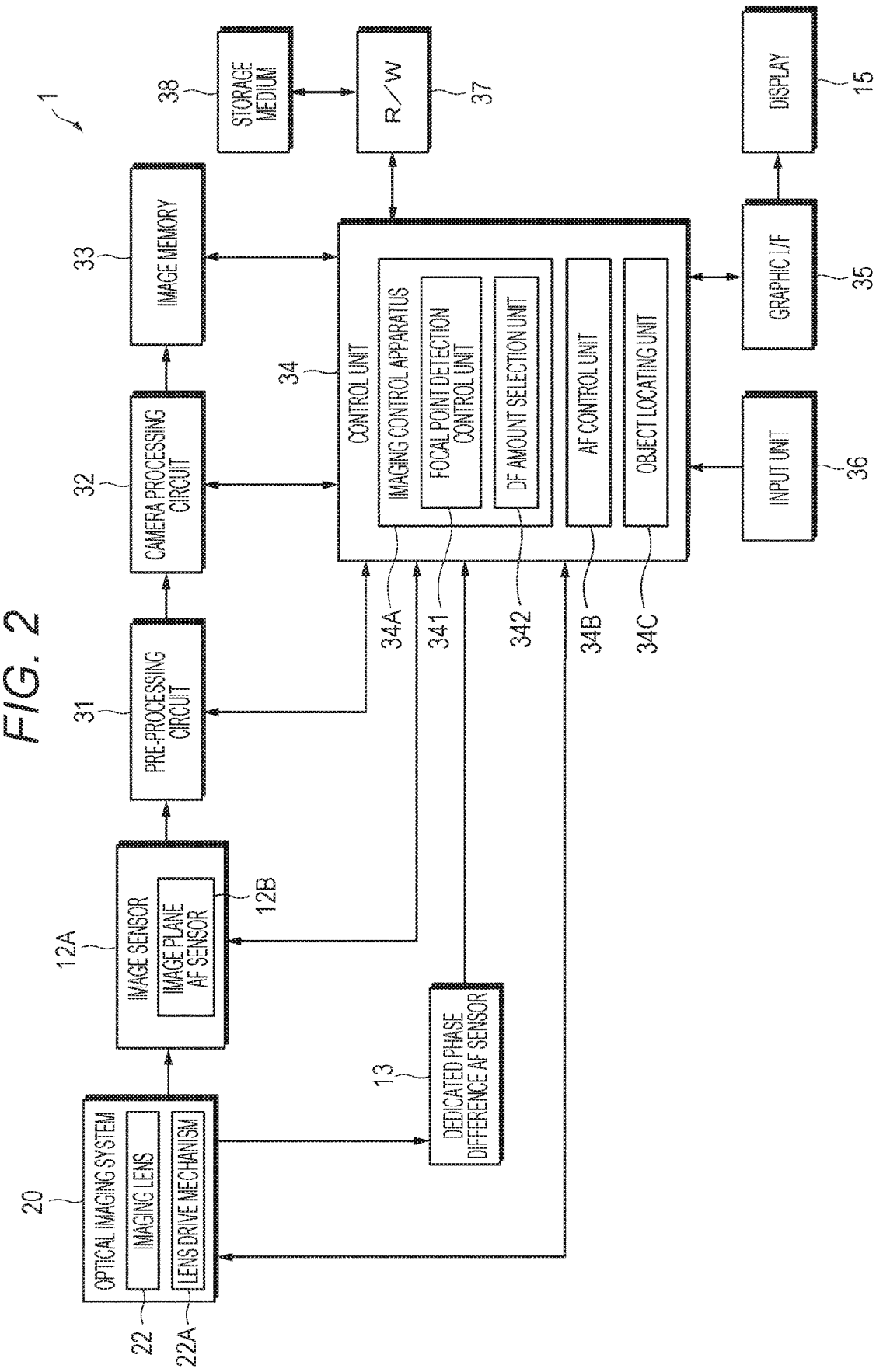
FIG. 2 is a block diagram illustrating an exemplary configuration of the imaging apparatus according to the embodiment of the present disclosure.

Next, an exemplary internal configuration of the imaging apparatus 1 (manly, an exemplary configuration relating to the signal processing) will be described with reference to a block diagram in FIG. 2. In addition to the above-described optical imaging system 20, dedicated phase difference AF sensor 13, image sensor 12A, image plane AF sensor 12B, and display 15, the imaging apparatus 1 includes, for example, a pre-processing circuit 31, a camera processing circuit 32, an image memory 33, a control unit 34, a graphic interface (I/F) 35, an input unit 36, a reader/writer (R/W) 37, and a storage medium 38.

The optical imaging system 20 is constituted by the imaging lens 22 for collecting light from the object to the image sensor 12A (including a focus lens and a zoom lens), a lens drive mechanism 22A that moves the focus lens to carry out focus adjustment, a shutter mechanism, an iris mechanism, and so on. These members are driven on the basis of a control signal from the control unit 34. The lens drive mechanism 22A moves the imaging lens 22 along an optical axis direction in accordance with the control signal supplied from the control unit 34, thereby implementing the AF action. An optical image of the object obtained via the optical imaging system 20 is formed on the image sensor 12A serving as an imaging device.

The dedicated phase difference AF sensor 13 is, for example, a sensor dedicated for auto focus according to the phase difference detection technique. The light from object collected by the imaging lens 22 is reflected on the semi-transmissive mirror 11, thereby entering the dedicated phase difference AF sensor 13. The focal point detection signal detected by the dedicated phase difference AF sensor 13 is supplied to the control unit 34.

The image sensor 12A has, as already described above, the usual imaging pixel and the phase difference detecting pixel. The image plane AF sensor 12B is a sensor for auto focus made up of the plurality of phase difference detecting pixels. The focal point detection signal detected by the image plane AF sensor 12B is supplied to the control unit 34.

The pre-processing circuit 31 performs, for example, sampling and holding on an imaging signal output from the image sensor 12A so as to maintain a signal/noise (S/N) ratio at a favorable level through correlated double sampling (CDS) processing. Additionally, the pre-processing circuit 31 controls gain through auto gain control (AGC) processing and performs analog-digital (A/D) conversion to output a digital image signal.

The camera processing circuit 32 applies the signal processing to the image signal from the pre-processing circuit 31, including white balance adjustment processing, color correction processing, gamma correction processing, Y/C conversion processing, and auto exposure (AE) processing.

The image memory 33 is a buffer memory constituted by a volatile memory such as a dynamic random access memory (DRAM) and used to temporarily hold the image data to which predetermined processing has been applied by the pre-processing circuit 31 and the camera processing circuit 32.

The control unit 34 is constituted by, for example, a central processing unit (CPU), a random access memory (RAM), and a read only memory (ROM). The ROM stores a program loaded and run by the CPU, and so on. The RAM is used as a work memory of the CPU. The CPU carries out a variety of processing tasks in line with the program stored in the ROM to issue a command, thereby controlling the entire imaging apparatus 1.

In addition, the control unit 34 has, for example, an imaging control apparatus 34A, an AF control unit 34B, and an object locating unit 34C as function blocks. The imaging control apparatus 34A has, for example, a focal point detection control unit 341 and a DF amount selection unit 342 serving as an exemplary selection unit, as function blocks. The focal point detection control unit 341 detects a focal point on the basis of information from an AF area (range-finding area) arranged in an imaging range. The DF amount selection unit 342 selects one amount of defocus from among a plurality of amounts of defocus in accordance with a predetermined condition. Note that examples of specific actions of the focal point detection control unit 341 and the DF amount selection unit 342 will be described later.

The AF control unit 34B controls the lens drive mechanism 22A of the optical imaging system 20 on the basis of the amount of defocus selected by the DF amount selection unit 342. The lens is moved along the optical axis direction by a predetermined amount in response to the lens drive mechanism 22A being controlled, whereby auto-focus control is carried out such that the object is focused.

The object locating unit 34C detects the object such as a specific person or thing within an image being processed through a publicly known object detection technology. To give an example, a face/object recognition technology by way of template matching, a matching method based on brightness distribution information on the object, or a method based on, for example, a portion with a skin color or a feature amount in a human face included in an image can be used as a method for detecting the object. Alternatively, these approaches may be combined to enhance the detection accuracy.

The graphic I/F 35 generates an image signal used for display on the display 15 from the image signal supplied from the control unit 34 and then supplies this signal to the display 15 to display an image. A through image being captured, an image recorded in the storage medium 38, and so on are displayed on the display 15.

The input unit 36 includes, for example, a power button for switching power on and off, a release button for instructing a start of recording of an image to be captured, an operation element for adjusting zoom, and a touch screen configured as an integrated body with the display 15. When input is made to the input unit 36, a control signal corresponding to the input is generated to be output to the control unit 34. In response to this, the control unit 34 carries out computational processing and control corresponding to the control signal.

The R/W 37 is an interface to which the storage medium 38 configured to record the image data generated during imaging and so on is connected. The R/W 37 writes data supplied from the control unit 34 to the storage medium 38 and also outputs data retrieved from the storage medium 38 to the control unit 34. The storage medium 38 is a mass storage medium such as a hard disk, Memory Stick (a registered trademark of Sony Corporation), and an SD memory card. The image is saved in a compressed state on the basis of a standard such as JPEG. In addition, exchangeable image file format (EXIF) data including additional information such as information regarding the saved image and imaging date and time is associated with that image to be saved together.

[Exemplary Fundamental Action of Imaging Apparatus]

A fundamental action of the above-described imaging apparatus 1 is described here. A signal obtained from light received and then photoelectrically converted by the image sensor 12A is sequentially supplied to the pre-processing circuit 31 prior to the capturing of an image. The pre-processing circuit 31 applies the CDS processing, the AGC processing and so on to the input signal and also converts the input signal to an image signal.

The camera processing circuit 32 carries out image quality correction processing on the image signal supplied from the pre-processing circuit 31 and supplies the resultant image signal to the graphic I/F 35 as a through image signal via the control unit 34. As a result, the through image is displayed on the display 15. A user can adjust an angle of view while looking at the through image displayed on the display 15.

Once a shutter button of the input unit 36 is pressed in this state, the control unit 34 outputs the control signal to the optical imaging system 20 to cause a shutter constituting the optical imaging system 20 to work. As a result, an image signal corresponding to one frame is output from the image sensor 12A.

The camera processing circuit 32 applies the image quality correction processing to the image signal corresponding to one frame supplied from the image sensor 12A via the pre-processing circuit 31 and then supplies the image signal obtained after the processing to the control unit 34. The control unit 34 compresses and encodes the input image signal and supplies encoded data that has been generated to the R/W 37. As a result, a data file containing a still image that has been captured is stored to the storage medium 38 via the R/W 37.

Meanwhile, in a case where the image file stored to the storage medium 38 is reproduced, the control unit 34 loads a still image file being selected from the storage medium 38 via the R/W 37 in accordance with operation input from the input unit 36. Decompression and decoding processing is applied to the loaded image file. Subsequently, the decoded image signal is supplied to the graphic I/F 35 via the control unit 34. As a result, the still image stored to the storage medium 38 is displayed on the display 15.

[About Phase Difference Detecting Pixel]

Next, an example of the phase difference detecting pixel will be described in detail. As illustrated in FIG. 3, the image sensor 12A has first phase difference detecting pixels P1 and second phase difference detecting pixels P2 as the phase difference detecting pixels configured to detect a phase difference. The phase difference detecting pixels are configured in such a manner that the first phase difference detecting pixel P1 and the second phase difference detecting pixel P2 make a pair so as to perform pupil division of the imaging lens 22. The first phase difference detecting pixel P1 and the second phase difference detecting pixel P2 have an optical characteristic different from that of the usual imaging pixel. The image plane AF sensor 12B is configured in such a manner that the plurality of pairs of the phase difference detecting pixels is provided therein.

FIGS. 4A and 4B are diagrams illustrating configurations of the phase difference detecting pixels. FIG. 4A illustrates the first phase difference detecting pixel P1, whereas FIG. 4B illustrates the second phase difference detecting pixel P2.

The first phase difference detecting pixel P1 has a light-receiving element 111. In addition, a microlens 112 is provided on a light incident side. Furthermore, a light-blocking layer 113 configured to block entering light is provided between the light-receiving element 111 and the microlens 112 to perform the pupil division. The light-blocking layer 113 is configured so as to have an aperture portion 114 located eccentric in one side direction relative to the center of the light-receiving element 111.

Because the first phase difference detecting pixel P1 is configured as described above, only part of incident light enters the light-receiving element 111 as illustrated in FIG. 4A.

The second phase difference detecting pixel has a light-receiving element 121. In addition, a microlens 122 is provided on a light incident side. Furthermore, a light-blocking layer 123 configured to block entering light is provided between the light-receiving element 121 and the microlens 122 to perform the pupil division. The light-blocking layer 123 is configured so as to have an aperture portion 124 located eccentric in one side direction relative to the center of the light-receiving element.

The light-blocking layer 123 is configured so as to block an opposite side of a direction blocked by the light-blocking layer 113 in the first phase difference detecting pixel P1. Therefore, each of the first phase difference detecting pixel P1 and the second phase difference detecting pixel P2 is configured to block light on an opposite side of the other relative to a range-finding direction.

Because the second phase difference detecting pixel P2 is configured as described above, only part of incident light enters the light-receiving element 121 as illustrated in FIG. 4B.

The phase difference detecting pixels are configured as described above, whereby so-called image plane phase difference AF is enabled using output from these phase difference detecting pixels. Note that the phase difference detecting pixel may be configured to function only as the phase difference detecting pixel but not as the usual pixel, or alternatively, may be configured to function as a pixel for both imaging and phase difference detection by utilizing one pixel constituted by two independent photodiodes. In such a pixel, the two respective photodiodes can trap light independently. Thus, the pixel functions as the phase difference detecting pixel during auto focus by detecting phase difference signals from the respective photodiodes, while functioning as one usual pixel during imaging to output the image signal. In addition, any type of the image sensor 12A may be employed as long as the image sensor 12A can detect a phase difference in addition to a usual imaging function, including an image sensor 12A having a structure in which a sensor for imaging and a sensor for image plane phase difference AF are laminated.

Note that the G pixels are assigned to the phase difference detecting pixels in FIG. 3. This is because there are a number of the G pixels equal to twice the number of each of the R pixels and the B pixels. However, the phase difference detecting pixels are not limited to the G pixels.

Figure 5:
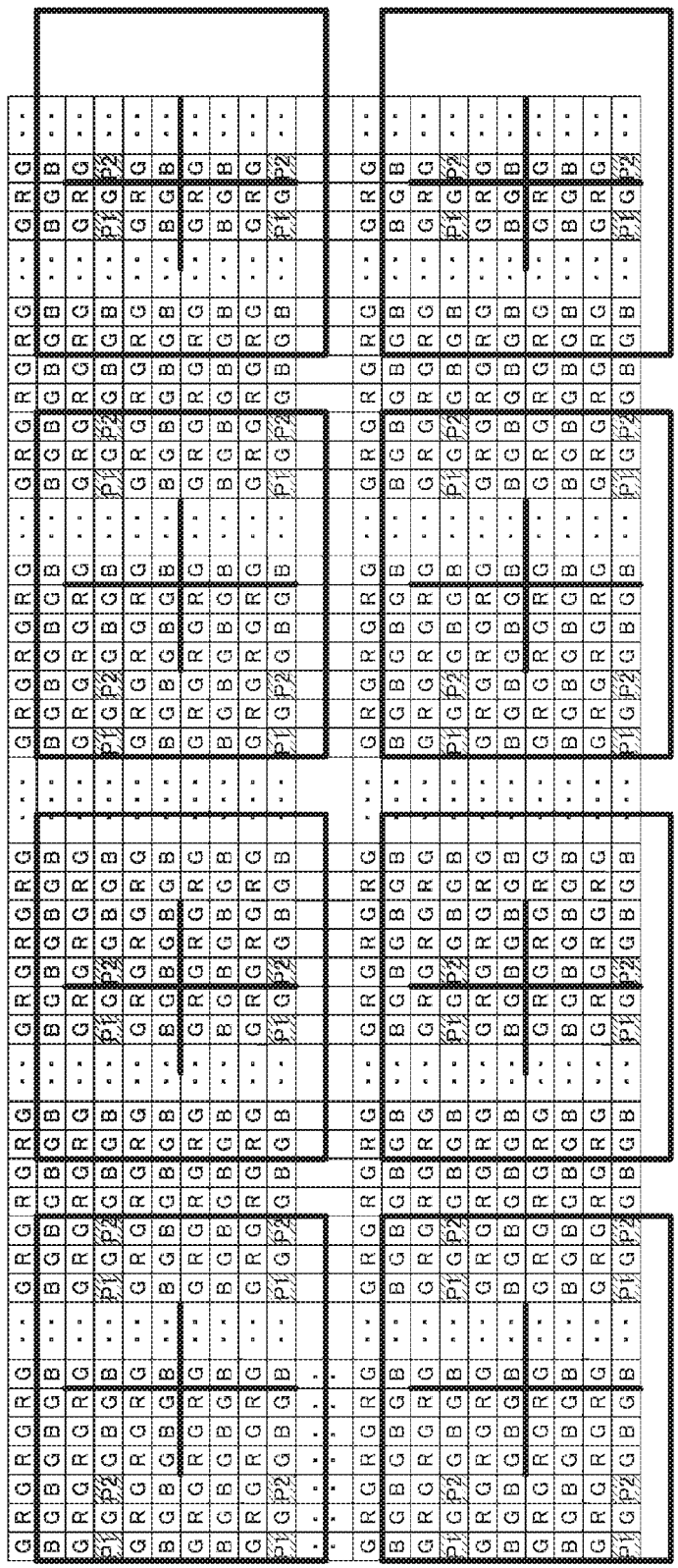
FIG. 5 is a diagram for explaining a configuration of image plane AF areas.

As illustrated in FIG. 5 as an example, the phase difference detecting pixels are distributed in the image sensor 12A so as not to affect an image to be captured. A group of elements (P1 and P2) set up for the pupil division so as to have apertures partially provided to detect phase differences are arranged side by side in a horizontal direction. Meanwhile, a line of these phase difference detecting pixels is inserted in every some lines in a vertical direction.

Figure 6:
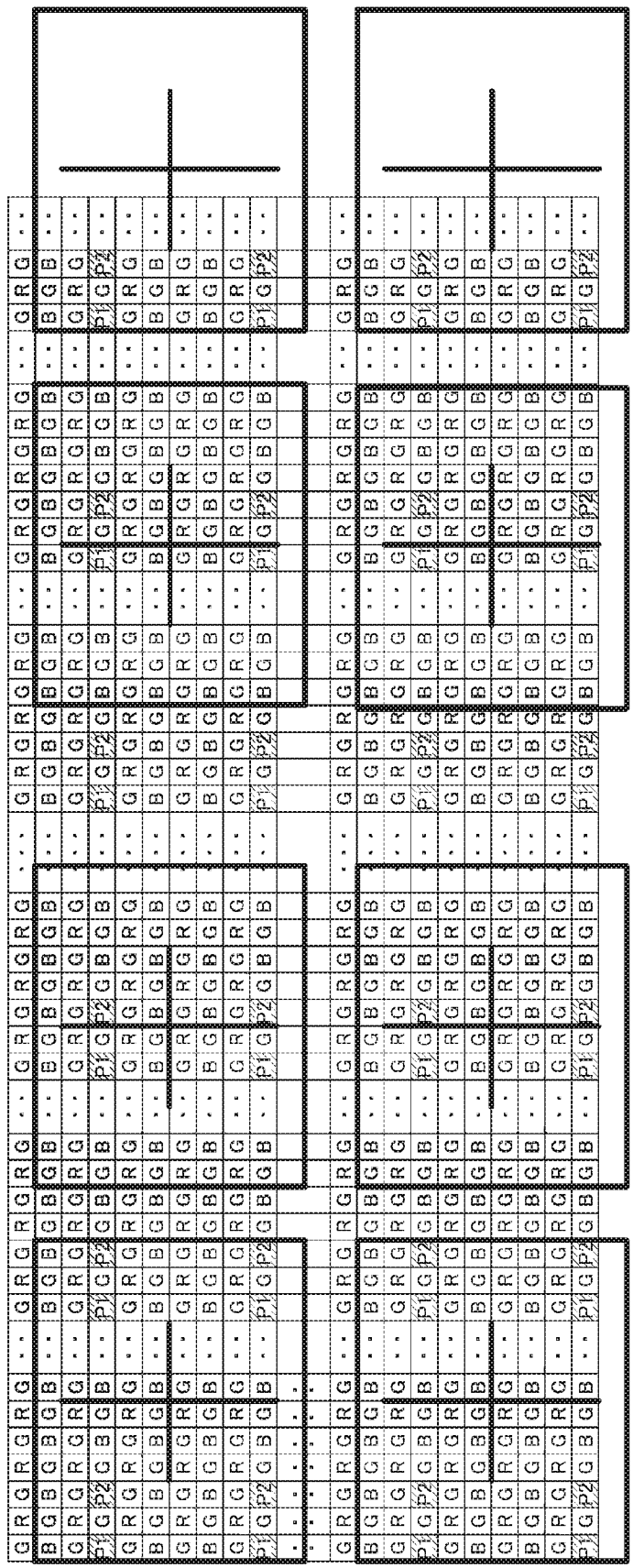
FIG. 6 is a diagram for explaining the configuration of the image plane AF areas.

AF areas are set for the phase difference detecting pixels arranged as described above by regarding the plurality of phase difference detecting pixels as one group (for example, rectangular frames depicted with thick lines in FIG. 5) and computation for focal point detection is carried out for each of these areas. Accordingly, when settings of the AF areas are shifted as illustrated in FIG. 6, the AF areas can be arranged non-uniformly. In other words, the arrangement of the AF areas can be freely set through processing by software.

Figure 7A:
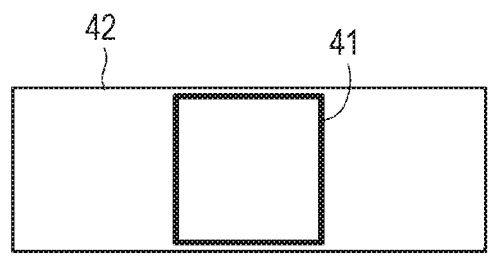
FIGS. 7A to 7C are diagrams for explaining a relation between the phase difference detecting pixels and AF areas.

Next, a relation between the AF areas serving as regions for which the amounts of defocus are to be calculated and the phase difference detecting pixels provided in the image sensor 12A will be described with reference to FIGS. 7A to 7C. FIG. 7A illustrates an imaging range by extracting one AF area 41 and a region used by the phase difference detecting pixels corresponding thereto during detection (hereinafter, referred to as phase difference pixel region 42). As illustrated in FIG. 7A, the AF area 41 depicted with a thick line and the phase difference pixel region 42 corresponding to this AF area 41, which is depicted with a thin line, do not have the same shapes and sizes and usually, the phase difference pixel region 42 is larger than the AF area 41.

Figure 7B:
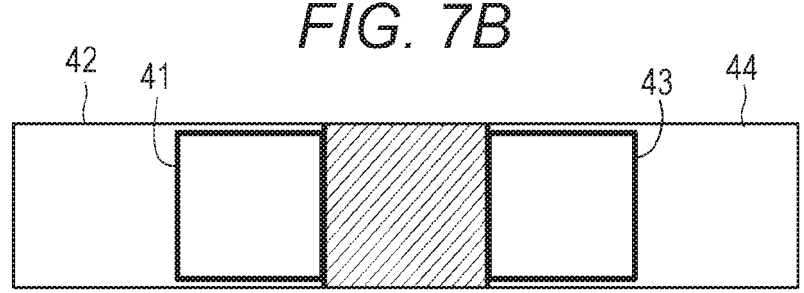
Figure 7C:
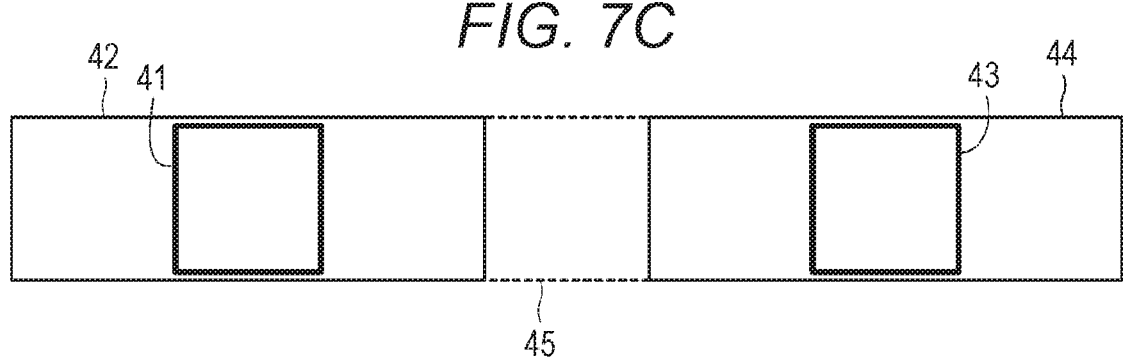

Accordingly, as illustrated in FIG. 7B, even in a case where multiple AF areas, namely, the AF area 41 and an AF area 43 are sparsely arranged with a gap, the phase difference pixel region 42 and a phase difference pixel region 44 for these multiple AF areas 41 and 43, respectively, overlap in some cases (a shading section in FIG. 7B). That is, there is a case where all of the phase difference detecting pixels are used even in a case where the multiple AF areas are sparsely arranged with gaps. In addition, in a case where the multiple AF areas 41 and 43 are sparsely arranged with a large gap and the phase difference pixel regions 42 and 44 corresponding to the AF areas 41 and 43, respectively, do not overlap as illustrated in FIG. 7C, the phase difference detecting pixels corresponding to a phase difference pixel region 45 not used in detection (a dashed line section in FIG. 7C) are stopped to work.

With the configuration described thus far, the imaging apparatus 1 can carry out AF using an image plane phase difference. Additionally, AF can be carried out by the dedicated phase difference AF sensor 13. For example, each of the AF modes can be independently carried out in parallel within a series of AF sequence tasks. Therefore, signals based on the respective AF modes can be obtained during the AF sequence. The series of AF sequence tasks means, for example, a series of processing procedures for AF continuously carried out during predetermined operation such as half-pressing of a release button, or alternatively, a period therefor.

[Features of Respective AF Techniques]

Next, a feature of AF by the dedicated phase difference AF sensor 13 and a feature of AF using the image plane phase difference will be described. Each of the AF techniques has strong points and weak points.

Typically, the dedicated phase difference AF sensor 13 is constituted by a line sensor in a longitudinal direction in many cases and thus, is able to handle a lateral pattern of the object. For example, the following points can be considered as strong points of the AF technique by the dedicated phase difference AF sensor 13.

Because of serving as a dedicated optical system, detection is possible even in a case where the object is considerably blurred. Fast pull-in from a large blur is achieved. The pull-in means, for example, a response until a lens position is driven to an in-focus state during AF processing.

Owing to being a large-scale dedicated sensor, good performance is obtained even during low brightness.

On the other hand, for example, the following points can be considered as weak points of the AF technique by the dedicated phase difference AF sensor 13.

Because a dedicated optical system is required in the AF area, the size of the AF sensor increases when cross range finding for many areas in the longitudinal direction and the lateral direction is aimed.

It is difficult to arrange the AF area in a peripheral portion due to restriction in the optical system.

Because the AF sensor is installed at a position different from the position of an imaging surface, an installation error can occur mechanically.

Because light flux is limited by a fixed diaphragm mask within the AF sensor, the enhancement of AF accuracy is hard to achieve when a brighter lens having an f-number of 1.4 or the like is mounted.

Typically, reading by the image plane AF sensor 12B is along the lateral direction in many cases and thus, the image plane AF sensor 12B is able to handle a longitudinal pattern of the object. For example, the following points can be considered as strong points of the AF technique using the image plane phase difference.

An arrangement in a wider region of the image sensor 12A is possible (a higher degree of freedom regarding the arrangement). Thus, the AF area according to the image plane phase difference also can be arranged so as to overlap the AF area according to the dedicated phase difference AF sensor 13.

Higher accuracy is achieved because range finding is carried out on the imaging surface of the image sensor 12A.

Higher accuracy is achieved because a baseline length can be extended when range finding is carried out by the lens with a maximum aperture.

On the other hand, for example, the following points can be considered as weak points of the AF technique using the image plane phase difference.

Because no dedicated optical system is provided, range finding is difficult when a large blur occurs.

Because the pixels of the image sensor 12A are used, good performance is difficult to obtain during low brightness.

Only the longitudinal pattern is detected in many cases due to restriction in a reading direction of the image sensor 12A.

Some of the features among these features are set forth in the following table as table 1.

TABLE 1

| | DEDICATED PHASE DIFFERENCE AF SENSOR | IMAGE PLANE PHASE DIFFERENCE AF SENSOR |
|---|---|---|
| DETECTION PERFORMANCE FOR OBJECT CONSIDERABLY BLURRED | ○ | X |
| DEGREE OF FREEDOM IN AREA ARRANGEMENT | X | ○ |

By taking this situation into consideration, the embodiment employs a configuration in which the AF area according to the dedicated phase difference AF sensor 13 and the AF area according to the image plane phase difference correspond to each other with regard to the object in the imaging range (e.g., at least one pixel of the range-finding area of the dedicated phase difference detection sensor has a one-to-one correspondence with at least one pixel of the range-finding area of the image plane phase difference detection sensor). For example, the AF area by the dedicated phase difference AF sensor 13 overlaps the AF area by the image plane AF sensor 12B (at an optical position). In different words, the AF area according to the image plane phase difference is arranged at a position of the AF area according to the dedicated phase difference AF sensor 13. The focal point detection control unit 341 detects a focal point on the basis of information from the AF area by the dedicated phase difference AF sensor 13 and information from the AF area by the image plane AF sensor 12B.

In addition, as described earlier by referencing FIG. 7A to 7C, there is a case where an AF area according to the image plane phase difference differs from a range of the phase difference detecting pixels used in computation corresponding to the AF area. Accordingly, the AF area by the dedicated phase difference AF sensor 13 may be arranged so as to overlap a range of the phase difference detecting pixels used in AF according to the image plane phase difference.

According to the arrangement of the AF areas as described above, AF taking advantages of both the AF techniques can be implemented and at the same time, a cross sensor capable of detecting a longitudinal pattern and a lateral pattern in an overlapping area can be realized. Note that the imaging range means, for example, a range contained in an imaging angle of view of the imaging apparatus 1 and serves as a range of the object acquired as image data.

Figure 8:
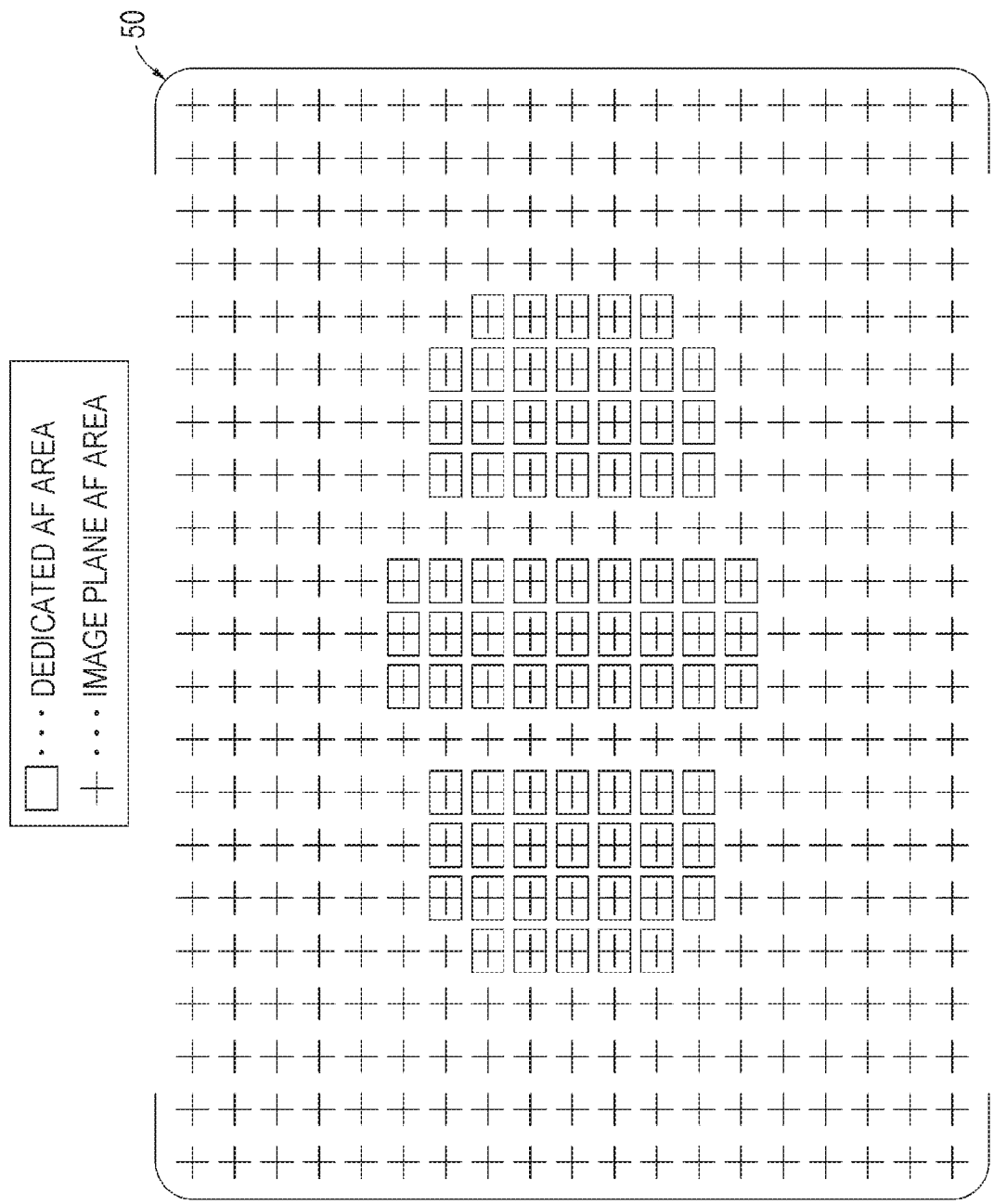
FIG. 8 is a diagram illustrating an exemplary arrangement of the image plane AF areas and dedicated AF areas in an imaging range.

A specific example of the arrangement of the AF areas will be described. FIG. 8 is a diagram illustrating the AF areas by the dedicated phase difference AF sensor 13 within an imaging range 50 (hereinafter, referred to as dedicated AF areas) and the AF areas by the image plane AF sensor 12B within the imaging range 50 (hereinafter, referred to as image plane AF areas). In addition, the exemplary arrangement of AF in FIG. 8 represents an exemplary arrangement in an initial state (for example, a state where the AF areas are arranged throughout an entire surface or a predetermined range of the imaging range 50 after the startup of the imaging apparatus 1).

In FIG. 8, AF areas indicated by quadrangular frames represent the dedicated AF areas. As it is clear from FIG. 8, a range where the dedicated AF areas are arranged is small, compared to the image plane AF areas and the dedicated AF areas gather substantially in the vicinity of the center.

In FIG. 8, AF areas indicated by cross marks represent the image plane AF areas. As it is clear from FIG. 8, the image plane AF areas spread throughout a broad range so as to be able to catch the object in a wide range.

Note that the AF areas illustrated in FIG. 8 represent regions corresponding to computation for carrying out AF control but differ from frames serving as user interfaces (UIs) (e.g., a frame having a rectangular shape) displayed for the user.

[About Setting Area]

Figure 9:
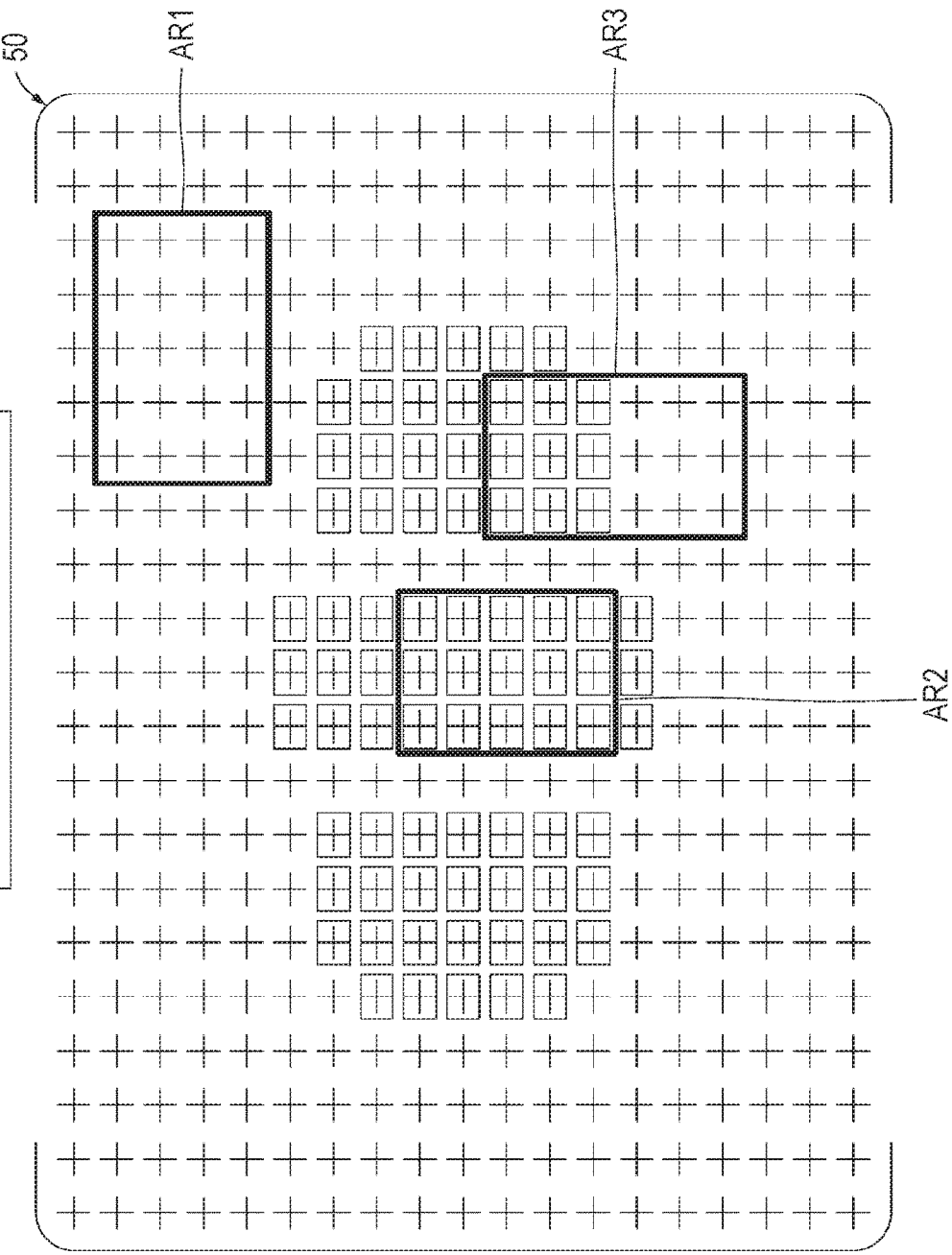
FIG. 9 is a diagram for explaining an example of setting areas.

Next, a setting area set within the imaging range 50 will be described. The setting area means, for example, an area corresponding to a point on which the user wants to focus. FIG. 9 illustrates an example of the setting areas. The size and position of the setting area can be altered by the user. In addition, the setting area can be set, for example, depending on modes. For example, the following modes can be considered as such modes.

Spot mode (a mode in which the user selects one frame from among a plurality of AF area frames presented as UIs and an area corresponding to the selected area functions as the setting area)

Extended flexible mode (a mode in which areas corresponding to priorities specified by the user (e.g., two priorities) function as the setting areas)

Zone mode (a mode in which the user selects a plurality of frames from among a plurality of AF area frames presented as UIs and areas corresponding to the selected areas function as the setting areas)

Object recognition mode (a mode in which an area containing an object recognized automatically functions as the setting area)

In addition, the setting area may be specifically set through input operation by the user.

FIG. 9 exemplifies three setting areas (setting areas AR1, AR2, and AR3). The setting area AR1 is an area made up of the image plane AF areas only, while the setting areas AR2 and AR3 are areas including the dedicated AF areas within the respective areas.

[About Selection Processing]

Next, processing of selecting the amount of defocus (DF) serving as information from the AF area in each of the setting areas will be described. A series of selection processing procedures for the amount of defocus described below is carried out by the DF amount selection unit 342.

A case where the setting area is made up of the image plane AF areas only (for example, the aforementioned case of the setting area AR1) will be described. In this case, DF data indicating the amount of defocus output from the image plane AF area is supplied to the AF control unit 34B and then auto focus control based on the DF data is carried out. That is, the selection processing is not carried out since the dedicated AF area is not present in the setting area AR1.

Figure 10:
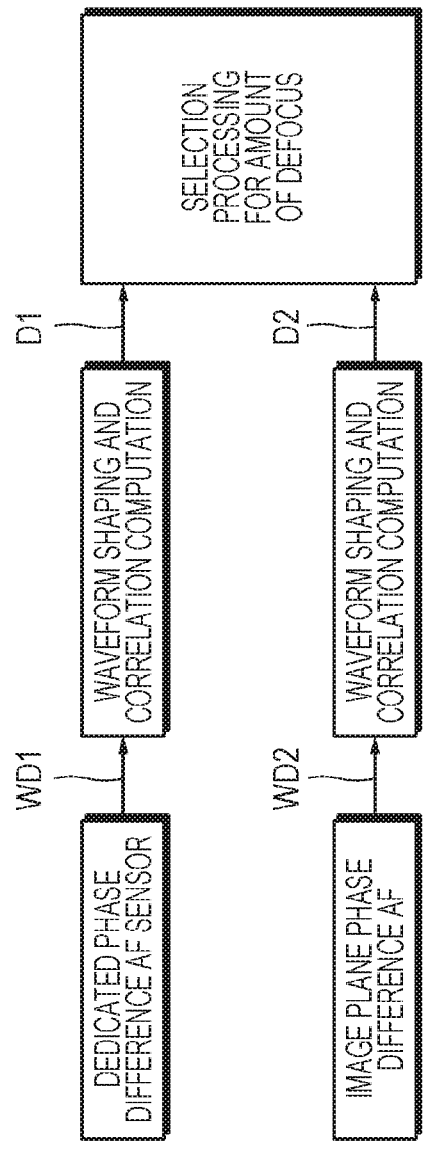
FIG. 10 is a diagram for explaining selection processing.

In a case where the dedicated AF area is present in the setting area, information from each of the dedicated AF area and the image plane AF area (e.g., the amount of defocus) is output during a series of AF sequence tasks. The selection processing is carried out in such a case. FIG. 10 is a diagram for explaining the selection processing. Waveform data WD1 is output from the dedicated AF area. The DF amount selection unit 342 carries out, for example, waveform shaping processing and correlation computational processing on the waveform data WD1 and then outputs DF data D1 indicating the amount of defocus.

Meanwhile, waveform data WD2 is output from the image plane AF area. Subsequently, the DF amount selection unit 342 carries out, for example, waveform shaping processing and correlation computational processing on the waveform data WD2 and then outputs DF data D2 indicating the amount of defocus.

The DF amount selection unit 342 selects which one of the DF data D1 and the DF data D2 to use on the basis of a predetermined condition. The selected DF data is supplied to the AF control unit 34B and then, AF control based on this DF data is carried out.

Exemplary predetermined conditions are described here. An example of the predetermined condition is "maximum aperture f-number".

In a case where the maximum aperture f-number of the imaging lens 22 is small (in a case where the imaging lens 22 is bright), a baseline length is extended and the accuracy is enhanced when range finding is carried out on the imaging surface. Accordingly, the DF data D2 output from the image plane AF sensor 12B is used (note that the baseline length of the dedicated phase difference AF sensor 13 is constant using an f-number of a particular imaging lens as a reference (for example, an f-number of 5.6), while the baseline length of the image plane AF sensor 12B becomes longer dependently as the maximum aperture f-number of the lens is reduced). Therefore, the selection of which DF data to use is determined depending on a value of the maximum aperture f-number. Note that the maximum aperture f-number may be stored to the imaging apparatus 1 in advance, or alternatively, may be supplied to the control unit 34 from the imaging lens 22 through communication.

In addition, another example of the predetermined condition is "extent of blur".

For example, in a case where the object is considerably blurred, higher detection accuracy is obtained in the dedicated phase difference AF sensor 13 in many cases because of having a dedicated optical system. Accordingly, the DF data D1 output from the dedicated phase difference AF sensor 13 is used. Whether the object is considerably blurred can be judged depending on, for example, a signal waveform of the DF data from the image plane AF sensor 12B.

In addition, another example of the predetermined condition is "amount of gain".

In some cases, gain is applied to the pixels (elements) constituting the dedicated phase difference AF sensor 13 and the image plane AF sensor 12B during imaging at a dark place when a signal is retrieved. An amount of this gain can be identified by the control unit 34. In the case of larger gain, signal-to-noise (S/N) decreases and thus, the DF amount selection unit 342 selects DF data output from a sensor having smaller gain. In addition, there is a case where a signal cannot be obtained from the image plane AF sensor 12B depending on an extent of a dark place due to an insufficient exposure amount in the phase difference detecting pixel. In such a case, the DF data output from the dedicated phase difference AF sensor 13 is selected regardless of the amount of gain.

In addition, another example of the predetermined condition is "temperature information".

An installation position of the dedicated phase difference AF sensor 13 is away from the imaging surface of the image sensor 12A, such as a position above or below a mirror box in which the semi-transmissive mirror 11 is housed. Because the mirror box swells at high temperature and shrinks at low temperature, a distance between the installation position of the dedicated phase difference AF sensor 13 and the image sensor 12A varies. In a case where the temperature information indicates a higher or lower temperature than a predetermined temperature, the DF data output from the image plane AF area is selected. A temperature sensor for measuring a temperature for such temperature information may be installed at a proper section within the cabinet 10.

In addition, another example of the predetermined condition is "speed of object". The speed of the object can be calculated from, for example, a movement amount of the position of an object being handled between a current frame and a preceding frame of an image being processed and an elapsed time from the preceding frame to the current frame. In a case where the speed of the object is equal to or faster than a predetermined speed, the DF data output from the dedicated phase difference AF sensor 13 is selected since the accuracy of range finding is unlikely to be degraded even when the object is considerably blurred.

The conditions exemplified thus far may be used separately as an independent condition, or alternatively, the plurality of conditions may be used together. In a case where the plurality of conditions is used together, evaluation values may be given to the DF data D1 and D2 for each of the conditions such that DF data ultimately obtaining a higher evaluation value is selected. Alternatively, priorities may be given thereto for each of the conditions such that DF data corresponding to a condition having a higher priority is selected.

In addition, the selection processing may be repeated during a series of AF control tasks. In this case, DF data from an AF area selected during previous selection processing may be selected during particular selection processing, or alternatively, one of the DF data D1 and the DF data D2 may be selected using the above-described conditions every time the selection processing is carried out.

[About Synchronous Processing]

Next, synchronous processing will be described. The synchronous processing is, for example, processing to associate the DF data D1 output from the dedicated AF area with the DF data D2 output from the image plane AF area on the basis of a predetermined condition.

Figure 11:
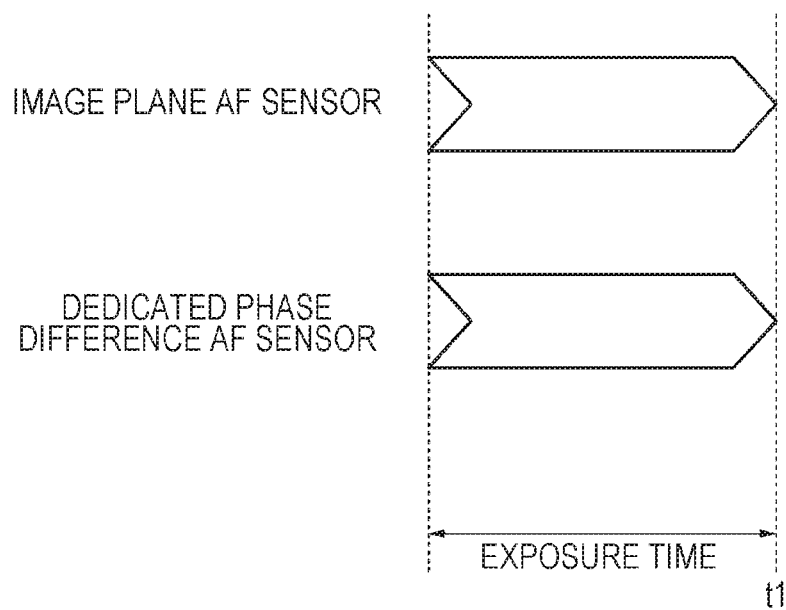
FIG. 11 is a diagram for explaining a case where synchronous processing is not to be carried out.

To give an example, as schematically illustrated in FIG. 11, when a wave detection timing of the dedicated phase difference AF sensor 13 and a wave detection timing of the image plane AF sensor 12B are similar to each other, the above-described selection processing is simply carried out on the respective pieces of the DF data obtained through wave detection and the synchronous processing does not need to be carried out. Note that the wave detection timing represents, for example, a timing at which each of the sensors carries out correlation computation and the like on the waveform data WD obtained after exposure and then outputs the DF data. FIG. 11 illustrates the wave detection timing as a timing t1. Usually, however, the wave detection timings of both of the sensors are different from each other by considering an object tracking characteristic and so on and additionally, exposure amounts (exposure times) for the elements of the respective sensors are different as well. The synchronous processing is carried out by taking such a point into consideration.

Figure 12:
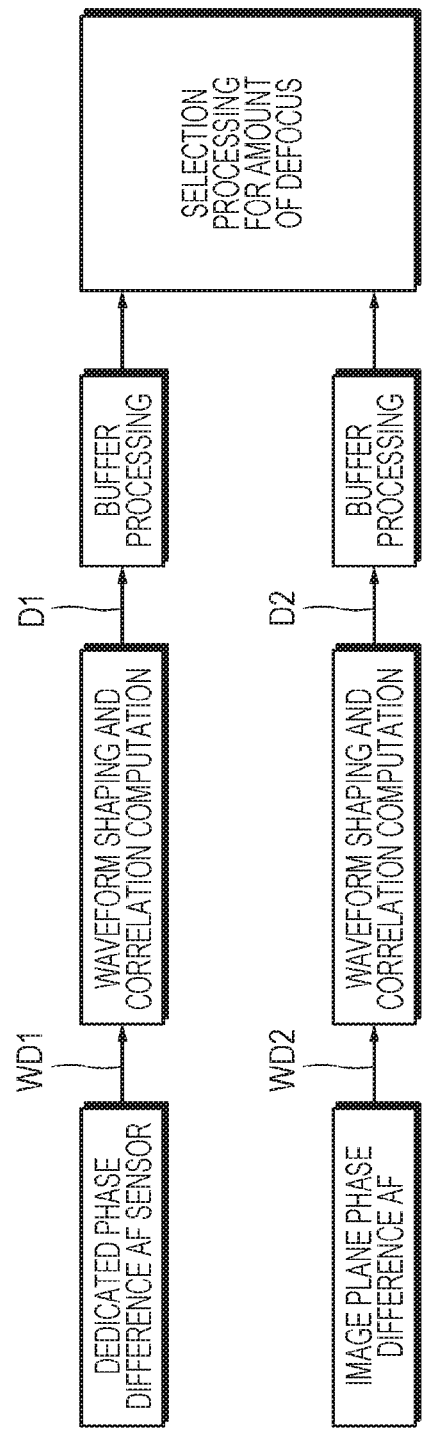
FIG. 12 is a diagram for explaining an example of the synchronous processing.

In a case where the synchronous processing is carried out, as illustrated in FIG. 12, buffer processing is carried out to store the DF data D1 output from the dedicated phase difference AF sensor 13 and the DF data D2 output from the image plane AF sensor 12B to a predetermined memory (for example, the RAM included in the control unit 34). Note that the DF data D1 and the DF data D2 may be stored to the same memory, or alternatively, different memories from each other.

Figure 13:
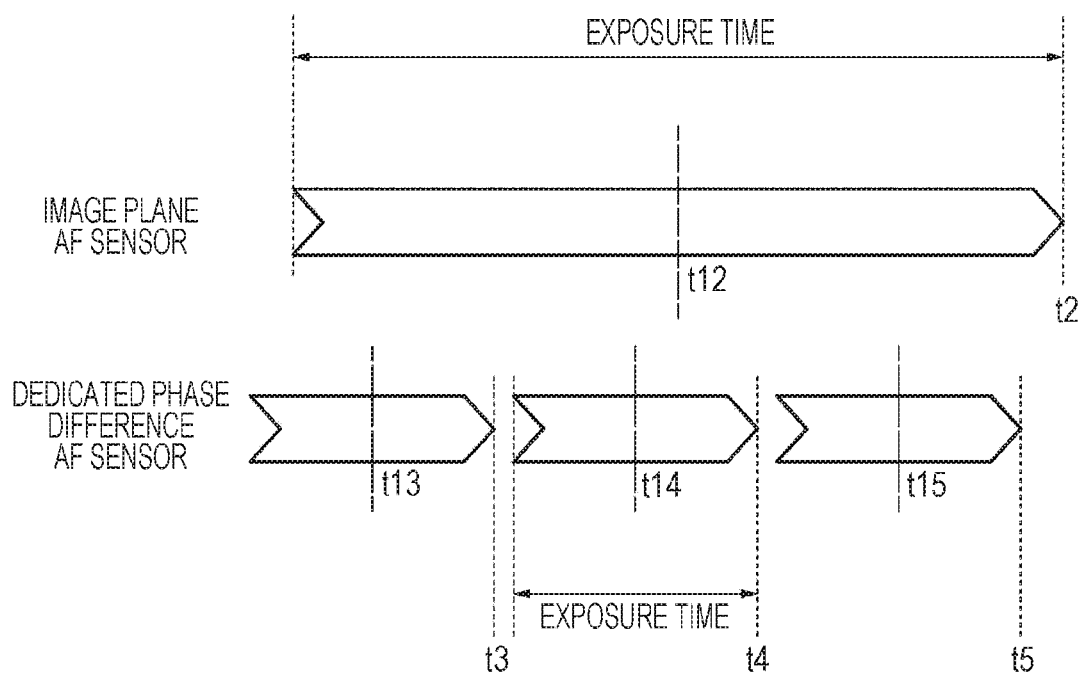
FIG. 13 is a diagram for explaining an example of the synchronous processing.

FIG. 13 illustrates an example of the synchronous processing. As illustrated in FIG. 13, the exposure time of the dedicated phase difference AF sensor 13 differs from the exposure time of the image plane AF sensor 12B. For example, the exposure time of the image plane AF sensor 12B is longer than the exposure time of the dedicated phase difference AF sensor 13. It is assumed here that the image plane AF sensor 12B outputs the DF data D2 at a wave detection timing t2. In addition, the dedicated phase difference AF sensor 13 detects waves three times within the exposure time of the image plane AF sensor 12B and outputs the DF data D1 individually at wave detection timings t3, t4, and t5.

The focal point detection control unit 341 here associates one piece of the DF data D1 with the DF data D2 on the basis of a predetermined condition. For example, two pieces of DF data obtained at wave detection timings having close or matching exposure centers of gravity are associated with each other. Note that the exposure center of gravity means the center of the exposure time and a timing of the exposure center of gravity of the image plane AF sensor 12B is a timing t12, while a timing of the exposure center of gravity of the wave detection by the dedicated phase difference AF sensor 13 is each of timings t13, t14, and t15.

As illustrated in FIG. 13, when the timing t12 is assumed as the exposure center of gravity of the image plane AF sensor 12B, a wave detection timing of the dedicated phase difference AF sensor 13 having an exposure center of gravity closer to the timing t12 is the wave detection timing t4 at the second time (whose timing of the exposure center of gravity is the timing t14). In line with this, the DF data D1 obtained at the wave detection timing t4 at the second time is associated with the DF data D2. The above-described selection processing is carried out on the DF data D1 and the DF data D2 associated with each other. In addition, the DF data D1 obtained at the wave detection timing t4 is stored in a memory at least until the wave detection timing t2 through the buffer processing.

Two pieces of DF data having close wave detection timings may be associated with each other. For example, a wave detection timing of the dedicated phase difference AF sensor 13 closer to the wave detection timing t2 of the image plane AF sensor 12B is the wave detection timing t5. In line with this, the DF data D1 obtained at the wave detection timing t5 may be associated with the DF data D2.

Figure 14:
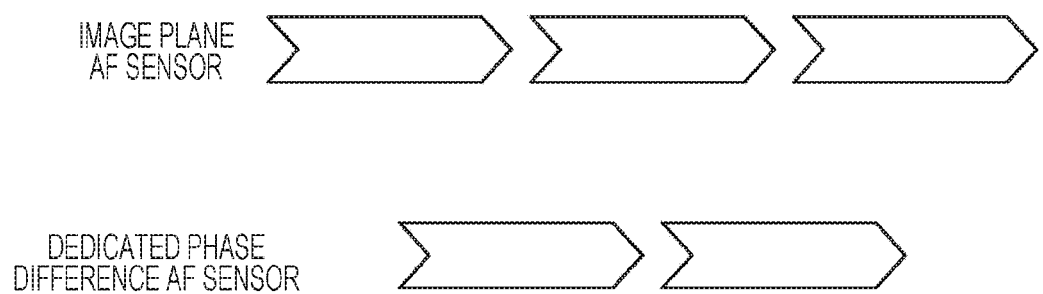
FIG. 14 is a diagram for explaining another example of the synchronous processing.

Meanwhile, as illustrated in FIG. 14, in an area where the dedicated AF area and the image plane AF area are arranged and thus, cross range finding is possible, range-finding actions according to the respective AF techniques may be alternately carried out such that a cycle of the range finding is shortened. By deliberately shifting the wave detection timings from one another, DF of the object can be frequently selected. Additionally, two pieces of DF data having closer wave detection timings may be used in the selection processing.

Figure 15:
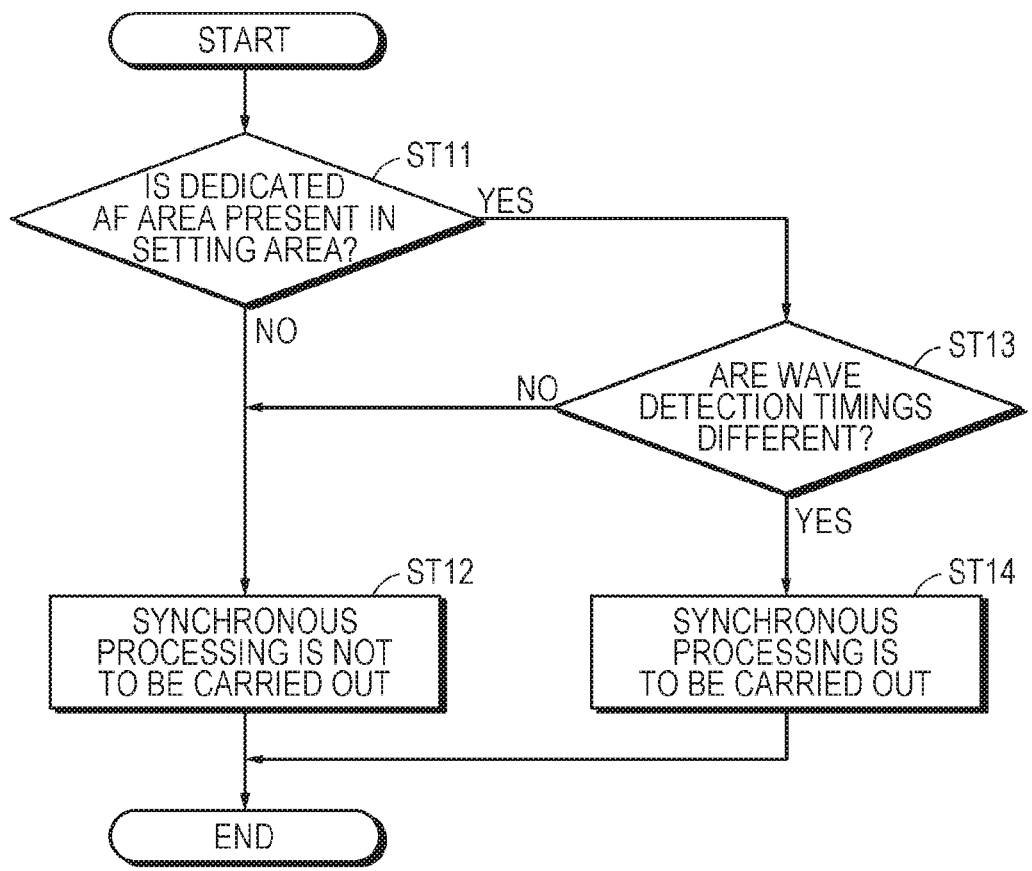
FIG. 15 is a flowchart illustrating a flow of processing to judge whether to carry out the synchronous processing.

FIG. 15 is a flowchart illustrating a flow of processing to judge the necessity of the synchronous processing. Step ST11 judges (e.g., determines) whether the dedicated AF area is present in the setting area. In a case where the dedicated AF area is not present therein, the processing proceeds to step ST12.

Step ST12 judges that the synchronous processing is not to be carried out because the setting area only includes the image plane AF area. Subsequently, the processing is terminated.

In a case where the dedicated AF area is present in the setting area according to the judgment processing at step ST11, the processing proceeds to step ST13. Step ST13 judges whether the wave detection timings are the same. When the wave detection timings are the same here, the processing proceeds to step ST12 and it is judged that the synchronous processing is not to be carried out. Subsequently, the processing is terminated.

In a case where it is judged at step ST12 that the wave detection timings are different, the processing proceeds to step ST14. Step ST14 judges that the synchronous processing is to be carried out and then, the above-described synchronous processing is carried out. Subsequently, the processing is terminated. In addition, after the synchronous processing is carried out, the above-described selection processing is carried out as appropriate.

2. Variations

Note that the present disclosure can be also configured as described below.

(1)
An imaging control apparatus including a focal point detection control unit that detects a focal point on the basis of information on a first range-finding area by a first phase difference detection sensor and a second range-finding area by a second phase difference detection sensor located at an image sensor, range-finding areas corresponding to each other with respect to an object in an imaging range of an imaging unit.

(2)
The imaging control apparatus according to (1), in which the first range-finding area and the second range-finding area overlap.

(3)
The imaging control apparatus according to (1) or (2), in which the information from the first range-finding area and the information from the second range-finding area are output during a series of auto-focus control procedures.

(4)
The imaging control apparatus according to any one of (1) to (4), further including a selection unit that selects which one of the information from the first range-finding area and the information from the second range-finding area to use, on the basis of a predetermined condition.

(5)
The imaging control apparatus according to (4), in which the selection unit selects the information in accordance with at least one condition among an f-number, an extent of blur, and an amount of gain.

(6)
The imaging control apparatus according to any one of (1) to (5), in which the focal point detection control unit judges whether synchronous processing is to be carried out, in accordance with whether the first range-finding area is present in the imaging range.

(7)
The imaging control apparatus according to (6), in which the focal point detection control unit carries out the synchronous processing in a case where the first range-finding area is present in a setting area set within the imaging range.

(8)
The imaging control apparatus according to (7), in which the synchronous processing is processing to associate the information from the first range-finding area with the information from the second range-finding area in accordance with a predetermined condition.

(9)
The imaging control apparatus according to (8), in which the predetermined condition is whether or not a timing of an exposure center of gravity of the first phase difference detection sensor matches or is approximate to a timing of an exposure center of gravity of the second phase difference detection sensor.

(10)
The imaging control apparatus according to any one of (1) to (9), in which
the first phase difference detection sensor and the second phase difference detection sensor are line sensors capable of detecting patterns in the same direction or patterns in directions perpendicularly intersecting with each other.

(11)
The imaging control apparatus according to any one of (1) to (10), in which
the first phase difference detection sensor is a sensor constituted by a pair of line sensors arranged in a cross form.

(12)
The imaging control apparatus according to any one of (7) to (9), in which
the setting area is an area set by a user.

(13)
The imaging control apparatus according to any one of (7) to (9), in which
the setting area is an area set in accordance with modes.

(14)
The imaging control apparatus according to any one of (1) to (13), in which
the first phase difference detection sensor is provided at a location different from a location of the image sensor.

(15)
The imaging control apparatus according to any one of (1) to (14), including:
the imaging unit;
the first phase difference detection sensor; and
the second phase difference detection sensor.

(16)
An imaging control method, in which
a focal point detection control unit detects a focal point on the basis of information on a first range-finding area by a first phase difference detection sensor and a second range-finding area by a second phase difference detection sensor located at an image sensor, range-finding areas corresponding to each other with respect to an object in an imaging range of an imaging unit.

A configuration may be employed in which at least one of the semi-transmissive mirror 11 and the dedicated phase difference AF sensor 13 is not included in the cabinet 10 of the imaging apparatus 1 but included in a configuration that can be attached to and detached from the cabinet 10 (for example, an adapter for mounting a variety of lenses). Any location different from that of the image sensor 12A may be used. Alternatively, the dedicated phase difference AF sensor 13 may be provided at a lower part of the cabinet 10.

The dedicated phase difference AF sensor 13 may be a cross sensor constituted by a pair of AF sensors (line sensors) arranged in a cross form, rather than the line sensor. In addition, the image plane AF sensor 12B may be a sensor in the longitudinal direction capable of detecting a lateral pattern. Alternatively, sensors capable of detecting a longitudinal pattern and a lateral pattern may be mixed as the image plane AF sensor 12B.

The embodiments according to the present disclosure have been specifically described thus far. However, the present disclosure is not limited to the aforementioned respective embodiments and various modifications based on the technological spirit of the present disclosure can be made. To give an example, configurations, methods, processes, shapes, materials, numerical values, and so on used in the above-described embodiments merely serve as examples. Configurations, methods, processes, shapes, materials, numerical values, and so on different therefrom may be used as necessary. A configuration for implementing the above-described embodiments and variations may be added as appropriate.

The imaging apparatus according to one of the above-described embodiments may be built into medical equipment such as a microscope, a smartphone, a computer apparatus, game equipment, a robot, a security camera, and a moving assembly (e.g., a vehicle, a train, a plane, a helicopter, a small flight vehicle, a construction vehicle, and an agricultural vehicle).

Components constituting the above-described imaging apparatus are not necessarily required to be integrally configured as the imaging apparatus and each component may be configured as an apparatus including part of the configurations as an independent unit. For example, the present disclosure can be implemented independently as the imaging control apparatus. Alternatively, for example, the display may be configured as an independent apparatus serving as a display apparatus. Alternatively, the above-described imaging apparatus 1 may be configured according to the imaging control apparatus. For example, the imaging control apparatus may have a configuration including the imaging unit, the image plane AF sensor 12B, and the dedicated phase difference AF sensor 13. A control command and data of the respective apparatuses are transmitted and received through wired or wireless communication. As described thus far, the present disclosure can be not only implemented as an imaging system constituted by a plurality of apparatuses but also implemented by way of a method, a program, and so on.

REFERENCE SIGNS LIST

1 Imaging apparatus
12A Image sensor
12B Image plane AF sensor
13 Dedicated phase difference AF sensor
20 Optical imaging system
34A Imaging control apparatus
341 Focal point detection control unit
342 DF amount selection unit
AR Setting area

The invention claimed is:

1. An imaging control apparatus comprising:
   a focal point detection control circuitry configured to
      receive first information from a range-finding area of a dedicated phase difference detection sensor and second information from a range-finding area of an image plane phase difference detection sensor,
      detect a focal point based on at least one of the first information or the second information, and
      determine whether synchronous processing is to be carried out, in accordance with whether the range-finding area of the dedicated phase difference detection sensor is present in an imaging range.

2. The imaging control apparatus according to claim 1, wherein
   the range-finding area of the dedicated phase difference detection sensor and the range-finding area of the image plane phase difference detection sensor overlap with each other.

3. The imaging control apparatus according to claim 1, wherein
   the first information from the range-finding area of the dedicated phase difference detection sensor and the second information from the range-finding area of the image plane phase difference detection sensor are output during a series of auto-focus control procedures.

4. The imaging control apparatus according to claim 3, further comprising a selection circuitry that selects which one of the first information from the range-finding area of the dedicated phase difference detection sensor and the second information from the range-finding area of the image plane phase difference detection sensor to use, on a basis of a predetermined condition.

5. The imaging control apparatus according to claim 4, wherein
   the selection circuitry selects the first information or the second information in accordance with at least one condition among an f-number, an extent of blur, and an amount of gain.

6. The imaging control apparatus according to claim 1, wherein
   the focal point detection control circuitry carries out the synchronous processing in a case where the range-finding area of the dedicated phase difference detection sensor is present in a setting area set within the imaging range.

7. The imaging control apparatus according to claim 6, wherein
   the synchronous processing is processing to associate the first information from the range-finding area of the dedicated phase difference detection sensor with the second information from the range-finding area of the image plane phase difference detection sensor in accordance with a predetermined condition.

8. The imaging control apparatus according to claim 7, wherein
   the predetermined condition is whether a timing of an exposure center of gravity of the dedicated phase difference detection sensor matches or is approximate to a timing of an exposure center of gravity of the image plane phase difference detection sensor.

9. The imaging control apparatus according to claim 6, wherein
   the setting area is an area set by a user.

10. The imaging control apparatus according to claim 6, wherein
    the setting area is an area set in accordance with one of a plurality of modes.

11. The imaging control apparatus according to claim 1, wherein
    the dedicated phase difference detection sensor and the image plane phase difference detection sensor are line sensors capable of detecting patterns in the same direction or patterns in directions perpendicularly intersecting with each other.

12. The imaging control apparatus according to claim 1, wherein
    the dedicated phase difference detection sensor is a sensor constituted by a pair of line sensors arranged in a cross form.

13. The imaging control apparatus according to claim 1, wherein
    the dedicated phase difference detection sensor is provided at a location different from a location of the image plane phase difference detection sensor.

14. The imaging control apparatus according to claim 1, wherein at least one pixel of the range-finding area of the dedicated phase difference detection sensor has a one-to-one correspondence with at least one pixel of the range-finding area of the image plane phase difference detection sensor.

15. The imaging control apparatus according to claim 1, wherein the range-finding area of the dedicated phase difference detection sensor corresponds to the range-finding area of the image plane phase difference detection sensor with respect to an object in the imaging range of an imaging unit.

16. The imaging control apparatus according to claim 1, wherein the first information and the second information are based on a common light source.

17. The imaging control apparatus according to claim 1, wherein a size of the range-finding area of the dedicated phase difference detection sensor is smaller than a size of the range-finding area of the image plane phase difference detection sensor, and
wherein the range-finding area of the dedicated phase difference detection sensor overlaps in a vicinity of a center of the range-finding area of the image plane phase difference detection sensor.

18. An imaging control method, the method comprising:
receiving, with a focal point detection control circuitry, first information from a range-finding area of a dedicated phase difference detection sensor and second information from a range-finding area of an image plane phase difference detection sensor;
detecting, with the focal point detection control circuitry, a focal point on a basis of the first information and the second information; and
determining, with the focal point detection control circuitry, whether synchronous processing is to be carried out, in accordance with whether the range-finding area of the dedicated phase difference detection sensor is present in an imaging range.

19. The imaging control method according to claim 18, wherein determining, with the focal point detection control circuitry, whether the synchronous processing is to be carried out, in accordance with whether the range-finding area of the dedicated phase difference detection sensor is present in the imaging range further includes
determining whether the range-finding area of the dedicated phase difference detection sensor is present in a setting area set within the imaging range; and
carrying out the synchronous processing in response to determining that the range-finding area of the dedicated phase difference detection sensor is present in the setting area set within the imaging range.

20. An imaging apparatus comprising:
a dedicated phase difference detection sensor;
an image plane phase difference detection sensor; and
a focal point detection control circuitry configured to
receive first information from a range-finding area of the dedicated phase difference detection sensor and second information from a range-finding area of the image plane phase difference detection sensor,
detect a focal point based on at least one of the first information or the second information, and
determine whether synchronous processing is to be carried out, in accordance with whether the range-finding area of the dedicated phase difference detection sensor is present in an imaging range.

* * * * *